United States Patent [19]

Brück et al.

[11] Patent Number: 5,694,770
[45] Date of Patent: Dec. 9, 1997

[54] METHOD AND ASSEMBLY FOR OPERATING AN ELECTRICAL HEATER OF A CATALYTIC CONVERTER SYSTEM

[75] Inventors: Rolf Brück, Overath; Helmut Swars, Bergisch Gladbach, both of Germany

[73] Assignee: Emitec Gesellschaft fuer Emissionstechnologie mbH, Lohmar, Germany

[21] Appl. No.: 287,780

[22] Filed: Aug. 9, 1994

Related U.S. Application Data

[63] Continuation of PCT/EP92/00388, Feb. 24, 1992.

[51] Int. Cl.[6] ............................................. F01N 3/28
[52] U.S. Cl. .................... 60/274; 60/277; 60/300; 422/174; 422/180
[58] Field of Search ......................... 60/285, 286, 274, 60/277, 300; 422/174, 180, 199

[56] References Cited

U.S. PATENT DOCUMENTS

| | | | |
|---|---|---|---|
| Re. 32,286 | 11/1986 | Imai et al. | 364/431.04 |
| 5,201,173 | 4/1993 | Fujimoto et al. | 60/277 |
| 5,255,511 | 10/1993 | Maus et al. | 60/274 |
| 5,307,626 | 5/1994 | Maus et al. | 60/274 |
| 5,319,921 | 6/1994 | Gopp | 60/274 |
| 5,319,929 | 6/1994 | Cornelison et al. | 60/274 |
| 5,323,607 | 6/1994 | Tanaka et al. | 60/274 |
| 5,353,590 | 10/1994 | Pettit et al. | 60/274 |
| 5,353,591 | 10/1994 | Kabasin et al. | 60/274 |
| 5,357,754 | 10/1994 | Ogawa et al. | 60/276 |
| 5,361,582 | 11/1994 | Uchida et al. | 60/276 |
| 5,377,484 | 1/1995 | Shimizu | 60/276 |

FOREIGN PATENT DOCUMENTS

| | | |
|---|---|---|
| 393538 | 11/1991 | Australia . |
| 0456919 | 11/1991 | European Pat. Off. . |

OTHER PUBLICATIONS

Patent Abstracts of Japan, vol. 10299 (M524) Oct. 11, 1986 & JP-A-84-0234042 (Toyota) Nov. 8, 1984.

*Primary Examiner*—Nina Bhat
*Attorney, Agent, or Firm*—Herbert L. Lerner; Laurence A. Greenberg

[57] ABSTRACT

An assembly for operating an electrical heater in a catalytic converter system connected in an exhaust gas cleaning system downstream of an internal combustion engine. The electrical heater is supplied with an electrical heating current through an electronically controlled power switch. The system is heated with the electrical heater to or above a minimum temperature necessary for catalytic conversion. The temperature of the catalytic converter is measured and utilized as a controlled variable of at least two different control circuits. At least one preferred control circuit is defined from a plurality of control circuits. The system is controlled in regular operation with the preferred control circuit. The preferred control circuit is automatically monitored for malfunction and, if a malfunction is detected, control is automatically transferred to another control circuit.

16 Claims, 3 Drawing Sheets

METHOD AND ASSEMBLY FOR OPERATING AN ELECTRICAL HEATER OF A CATALYTIC CONVERTER SYSTEM

CROSS-REFERENCE TO RELATED APPLICATION

This application is a continuation under 35 U.S.C. §120 of international application PCT/EP92/00388, filed Feb. 24, 1992, and designating the United States.

BACKGROUND OF THE INVENTION

1. Field of the Invention

The invention relates to a method of operating a heater of an electrically heatable catalytic converter system, which is supplied with an electric current under the control of an electronic component, and whereby the converter system is brought to and/or maintained above a minimum temperature necessary for catalytic conversion.

The invention further relates to a corresponding apparatus. Electrical heating in catalytic converter systems is used particularly in motor vehicles in order to meet especially stringent exhaust gas regulations. As a rule, the heaters are disposed upstream of a main catalytic converter, as seen in the exhaust gas flow direction.

2. Description of the Related Art

An especially high amount of pollutants is produced by internal combustion engines in the so-called cold starting phase, i.e. during the first few minutes of operation before the engine reaches its operating temperature. It is precisely that phase during which the resultant pollutants cannot be well converted in the catalytic converter, because the converter has not reached its operating temperature either.

To remedy this, international publications WO 89/10470 and WO 89/10471 disclose electrically heatable converters and methods for operating them. Such converters are heated with a relatively high current within a relatively short time period to the temperature necessary for the progress of catalytic reactions. In that, a considerable portion of the pollutants produced in the cold starting phase can be converted. The heatable converters can be heated to their operating temperature either before the engine is started or immediately thereafter. It has also been known to combine these two options.

The high energy consumption of electrically heatable converters and the current intensities required for rapidly heating them make these converters atypical power consumers in a motor vehicle. The power, accordingly, must be electronically regulated and electrically switched using special means. Two mutually contradictory interests must be taken into account. On the one hand, with exhaust gas regulations in view, it must be assured that the electrically heatable catalytic converter will reliably perform its task each time the engine is started. On the other hand, the availability of the motor vehicle should not be impaired by the component, as would be conceivable if the heater malfunctioned and no additional precautions were taken. The fire safety of a motor vehicle must naturally also be assured, and damage to the exhaust cleaning system itself should be reliably avoided.

SUMMARY OF THE INVENTION

It is accordingly an object of the invention to provide a method and an assembly for operating an electrical heater of a catalytic converter system, which overcomes the hereinaforementioned disadvantages of the heretofore-known devices of this general type and which provides for maximum operating safety of the converter itself without impairing the availability of the motor vehicle.

With the foregoing and other objects in view there is provided, in accordance with the invention, a method of operating an electrical heater in a catalytic converter system, wherein the system is connected in an exhaust gas cleaning system downstream, as seen in an exhaust gas flow direction, of an internal combustion engine with an electronic engine control, wherein the electrical heater is supplied with an electrical current through a power switch operated by an electronic control, and wherein the electrical heater heats the system to or maintains the system above a minimum temperature necessary for catalytic conversion. The method comprises:

a) measuring a temperature of a catalytic converter and utilizing the temperature as a controlled variable of at least two different control circuits comprising first and second control circuits;

b) defining at least one first preferred control circuit from a plurality of control circuits, and controlling a catalytic converter system in regular operation with the at least one preferred control circuit;

c) automatically monitoring an operation of the preferred control circuit for malfunction; and d) if a malfunction is detected, automatically transferring control to the second of the plurality of control circuits.

In other words, the temperature of the converter system is a controlled variable of at least two different control circuits; in the normal state, the regulation is done by means of at least one preferential control circuit; each control circuit that is in operation is automatically monitored in order to ascertain malfunctions; if a malfunction is found, then a switchover to a different control circuit is made automatically.

The principle of the instantly disclosed invention is found in the fact that the regulation of the temperature of the converter is not solely dependent on the functioning of a single control circuit with various elements. Instead, substitute control circuits (emergency regulation) are provided, should the preferred control circuit actually intended for the regulation be found to be no longer functional. For instance, if in the normal situation the regulation is done by a preferential control circuit whose actual-value transducer is a temperature sensor in the converter, then there is a risk that this temperature sensor may become defective. If additional precautions were not taken, the converter would either not be heated at all in that case or would be heated uninterruptedly. Both situations, of course, are undesirable and the second case would even be dangerous.

In accordance with the invention, a malfunction of the control circuit is ascertained, however, so this circuit can be put out of operation and replaced with a different control circuit. The second control circuit can for example use a calculated temperature as the actual value, this temperature having been ascertained from data available from measuring sensors or from the engine control unit. In the simplest case, the regulation can be done by turning on the heating for a predetermined time. That type of regulation could also be called control, but for the sake of simplicity in these papers, no distinction will be made between control and regulation.

The number of different control circuits and which ones are furnished in an electronic component can depend on the applicable requirements for operational safety and availability of the electric heating of the catalytic converter. In order not to be dependent on a single control circuit, the electronic component may include at least two, for instance, of the following control circuits:

a) a control circuit with a temperature sensor in the catalytic converter as an actual-value transducer;

b) a control circuit in which the actual value is calculated by means of a heat balance calculation from data from the engine control unit;

c) a control circuit in which the actual value is ascertained from measured values from temperature measuring sensors outside the catalytic converter;

d) a control circuit that raises the temperature of the catalytic converter by specifying a heating time as a function of measured values, for instance from an ambient temperature sensor and/or an engine temperature sensor;

e) a control circuit that raises the temperature of the catalytic converter by specifying a fixed heating time.

All of these control circuits have the following elements in common: the catalytic converter as a controlled system, the power switch as a final control element, and the temperature in the catalytic converter as the controlled variable. In view of a few specifics, we will in the following particularly concentrate on the control loop according to b), because it can have particular importance in those cases in which a temperature sensor is not present in the catalytic converter or in which it is broken.

Principally, in an electronically controlled engine of the modern kind, a very large number of data are present in the engine control regarding the operational condition of the engine, so that it can be very exactly deduced therefrom how much fuel and how much air is reaching the engine at that moment, how much thereof is combusted, what the temperature is of the exhaust gas emanating at the exhaust manifold, and what residual energy content is still present in terms of yet convertible components in the exhaust gas. The temperature may be very reliably determined from that information and the known heat capacity of the catalytic converter, as well as from its power drain during the electrical heating.

The exhaust gas temperature Texh [° C.] can first be determined with an empirically determined approximation formula as follows:

$$Texh = m \cdot A \cdot (\log(t+2)^3)^B$$

where m=mass flow of gas [kg/s]
A=system-defined constant, e.g. 300
B=system-defined constant, e.g. 1.15
t=time after engine start [s]

If the mass flow m of the gas is not available from the engine control, then it may be calculated as follows:

$$m = \frac{HV \cdot n \cdot \rho Gas \cdot Psuct}{2 \cdot Pamb}$$

where HV=engine stroke volume [m³]
n=engine speed [1/s]
ρGas=1.2[kg/m³]
Psuct=suction pressure [bar]
Pamb=ambient pressure [bar]=1[bar]

The required amount of energy QGas, for heating the exhaust gas to the operating temperature can be calculated recursively by iteration:

$$QGas_{(n)} = (Texh - Tstart) \cdot m \cdot Cexh \cdot QGas_{(n-1)}$$

where n=index of calculation (e.g. second clock)
Tstart=temperature at which the catalytic reaction in the converter starts [° C.]
Cexh=heat capacity of exhaust gas=1000[J/kgK]

The amount of energy Qcat required for heating the catalytic converter to the temperature Tstart follows from:

Qcat=Qel·te·CHK·Tstart where Qel=heating power supplied [W]
te=time from beginning of heating
CHK=heat capacity of catalytic converter [J/kgK]

The electrical heating power may be calculated recursively according to the following:

$$Qel_{(n)} = Qel_{(n-1)} + \frac{U^2}{RHK}$$

where U=battery voltage [V]
RHK=electrical resistance of converter [Ω]

A sum total of the energy Qtot may be derived in the following heat balance calculation using the above calculated values:

$$Qtot_{(n)} = Qgas_{(n)} + Qcat + Qel_{(n)}$$

If $Qtot_{(n)}$ is negative, then the actual value of the temperature in the catalytic converter lies below Tstart, so that further heating is necessary. If $Qtot_{(n)}$ is positive, then the catalytic conversion begins, and heating may be stopped.

The setpoint value of the temperature in the catalytic converter and Tstart in the calculation may be time-dependently set higher with the age of the catalytic converter, so as to take into account a higher light-off temperature of the catalytic reaction due to the increased age of the catalyst. The constants A and B must be empirically adapted to vehicle-specific conditions, for instance to the distance of the catalytic converter from the engine and the layout of the exhaust gas system.

The calculations may be effected at a clock speed of one second, or faster, which suffices for providing sufficiently accurate actual values for regulating. The actual values thus ascertained may again be monitored as to whether or not they lie within a sensible and acceptable range. Should the calculated "actual values" fall outside of a range, then the regulating loop is defective, and it is necessary to switch to another regulating loop.

If two or more control circuits are present anyway, then it makes sense to operate them simultaneously. The advantage is found in mutual comparison and/or mutual monitoring with regard to malfunction. In that case, the control circuit having the most simple structure and hence the least likelihood of malfunction is assigned a securing function or security function, in that this control circuit turns on the electric current if turn-on is not effected by other control circuits, and it turns off the current if a turnoff by the other control circuits in accordance with predetermined criteria does not occur. It is proposed to choose a pure timing control means as the most simple control circuit, which turns the electric current on for a predeterminable time interval and/or turns it off again after a predeterminable time interval. The time interval can also be made dependent on certain values, such as the ambient temperature, the engine temperature, or other criteria.

For the availability of the motor vehicle, it is necessary for all the control circuits and hence the electric heating of the catalytic converter to be put out of operation under certain preconditions, for instance if certain predetermined conditions are met, such as the electrical voltage or available energy drops below a minimum value required to start the engine, or if the voltage drop across the power switch is outside an allowable range. It is especially helpful to measure the voltage across the power switch. As long as the power switch is open, the full battery voltage is applied to it and can be checked. If the power switch is closed, then the voltage drop at the switch becomes very small as long as the system is functioning properly. If a larger voltage drop is present, then the catalytic converter is either short-circuited, or the power switch is defective and has an overly high resistance. Both these situations should cause shutoff of the heating system. If when the power switch is closed the voltage does not decrease, then the heating current circuit must have been interrupted. Measuring the voltage drop across the power switch is therefore a highly versatile way of monitoring the functional capability of the system.

A malfunction in the heating system of the catalytic converter should be indicated as an error message and/or stored in memory. In many cases, a diagnosis or elimination of possible errors is already made possible in that way. Depending on the code requirements in various countries, such an error may also entail a limitation of driving operation, so as to force the vehicle driver to seek out a repair facility.

With the above and other objects in view, there is also provided, in accordance with the invention, an assembly for operating an electrically heated catalytic converter system connected in an exhaust gas system of a motor vehicle. The assembly according to the invention comprises an electrical circuit for providing electrical power of between 0.5 and 10 kW, including a current source, a power switch, an electrically heatable catalytic converter system and electrical lines connecting the current source, the power switch and the electrically heatable catalytic converter system; at least two different control circuits, the power switch being a common final control element of the at least two different control circuits, the catalytic converter system being a common controlled system of the at least two different control circuits, and a temperature in the catalytic converter system being a controlled parameter of the control circuits; an electronic component having disposed therein control electronics associated with individual ones of the control circuits, and the electronic component including means for monitoring the control circuits and for selecting a functioning control circuit.

In other words, the power switch is a common control member and the catalytic converter is the common regulating path of at least two different regulating loops, whose common controlled value is the temperature in the catalytic converter. The control electronics are disposed in an electronic component and are associated with respective ones of the various regulating loops. The electronic component includes means for testing the regulating loops and for selecting a functional regulating loop.

The electronic component may either be integrated in the engine control of a motor vehicle or it may be disposed separately. Generally, at least the power switch is disposed separately for reasons of safety with regard to electromagnetic interference.

A first control circuit preferably includes a temperature sensor in the catalytic converter as an actual-value transducer connected to the electronic component. An actual-value transducer, which calculates an actual value for the temperature in the catalytic converter from data from the engine control unit (and optionally by processing other measured values) belongs to a second control circuit. Finally, a simple timing control means or a timing control means dependent on measured values is present as a further control circuit.

Other features which are considered as characteristic for the invention are set forth in the appended claims.

Although the invention is illustrated and described herein as embodied in a method and an assembly for operating an electrical heater in a catalytic converter system, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
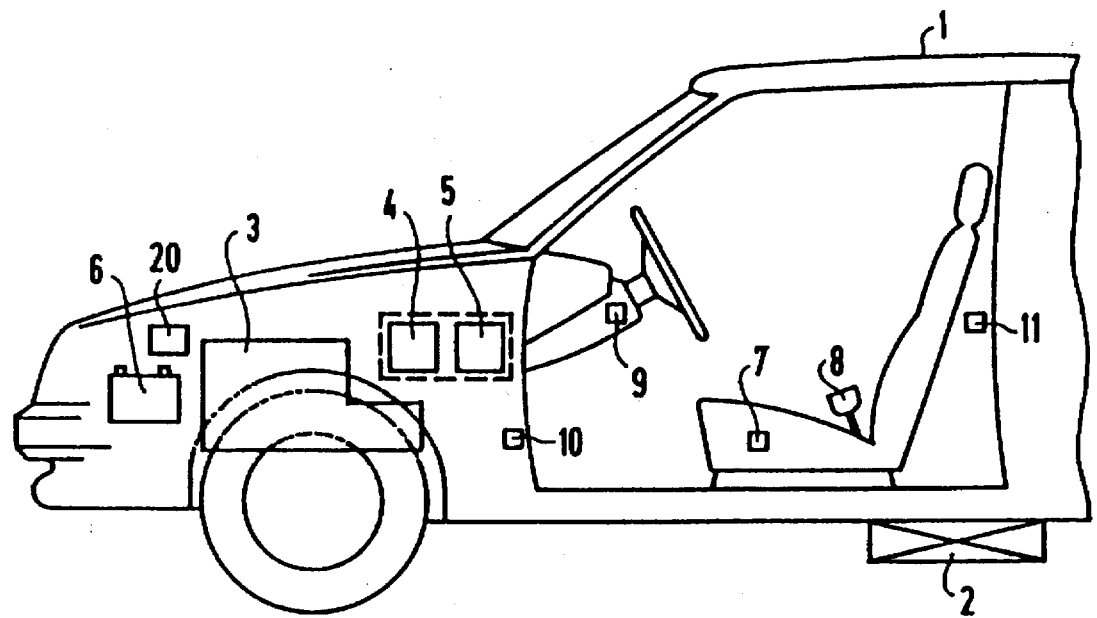
FIG. 1 is a schematic view of portion of a motor vehicle with an electrically heatable catalytic converter and other components.

Referring now to the figures of the drawing in detail and first, particularly, to FIG. 1 thereof, there is seen a forward portion of a motor vehicle 1 with an electrically heatable catalytic converter 2 disposed beneath the floorboard and downstream of an internal combustion engine 3, as seen in an exhaust gas flow direction. The engine 3 communicates with an engine control unit 4 via control and measurement lines 42. An electronic component 5 also communicates with the engine control unit 4 via data communication lines 41. As schematically illustrated, the engine control unit 4 and the electronic component 5 can also be combined into one unit. The vehicle is equipped with a battery 6 and various sensors 7, 8, 9, 10 and 11 disposed at the driver's seat, the safety belt lock, the ignition lock, the door and/or the door handle, respectively. A temperature sensor 12 for measuring the outside temperature or the engine temperature can also be present. A heavy duty switch or power switch 20, which is suitable for switching high currents of up to several hundred amperes, it disposed generally near the battery.

Figure 2:
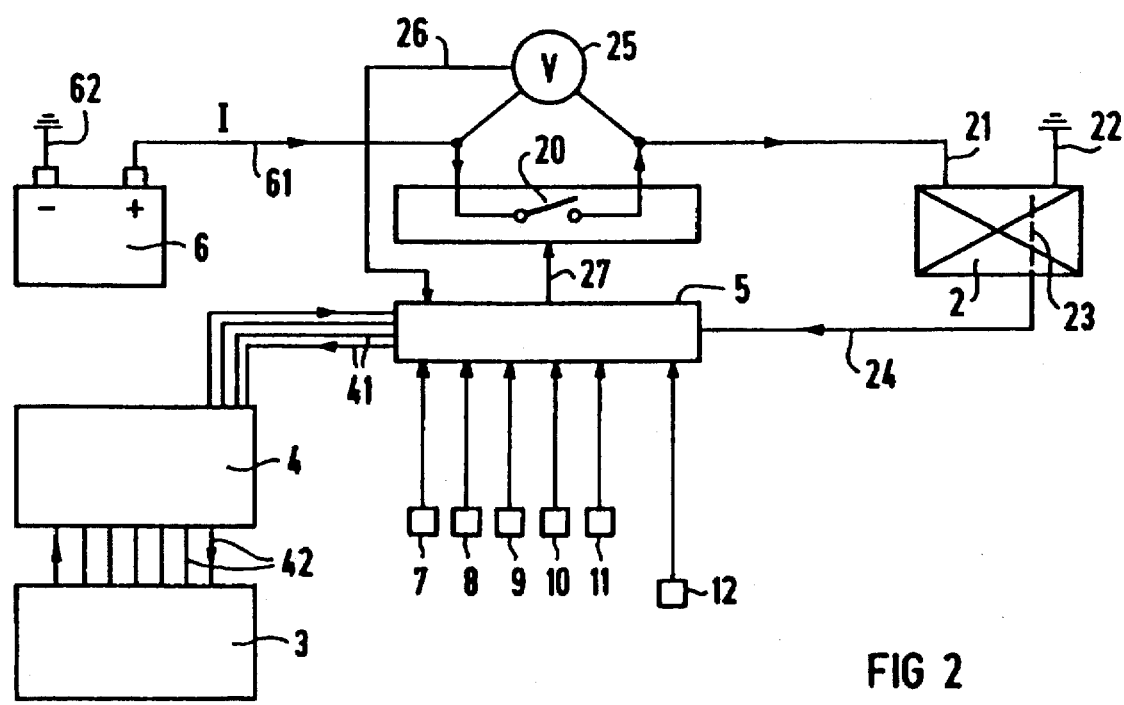
FIG. 2 is a diagrammatic view of an electrical and electronic system forming part of the electrically heatable catalytic converter.

Referring now specifically to FIG. 2, the actual heating current circuit comprises the battery 6, the heating current line 61, the power switch 20, the heating current line 21, the catalytic converter 2, the ground 22, and the ground 62. In principle, a generator could be used as an energy source instead of the battery 6, if the heating of the catalytic converter is to be done only after the engine 3 is started.

The power switch 20 is triggered as needed by the electronic component 5 via a control line 27. The voltage drop across the power switch 20 can be measured with a voltmeter 25, and a signal representative of the measurement outcome can be communicated to the electronic component 5 via a measuring line 26. The electronic component 5 communicates with the engine control unit 4 via the lines 41, so that data can be transmitted both from the engine control unit 4 to the electronic component 5 and vice versa.

The electronic component 5 also communicates via a measuring line 24 with a temperature sensor 23 in the catalytic converter 2. The signals from of the optional sensors 7, 8, 9, 10, 11, and an optional temperature probe 12 can also lead to the electronic component 5.

Figure 3:
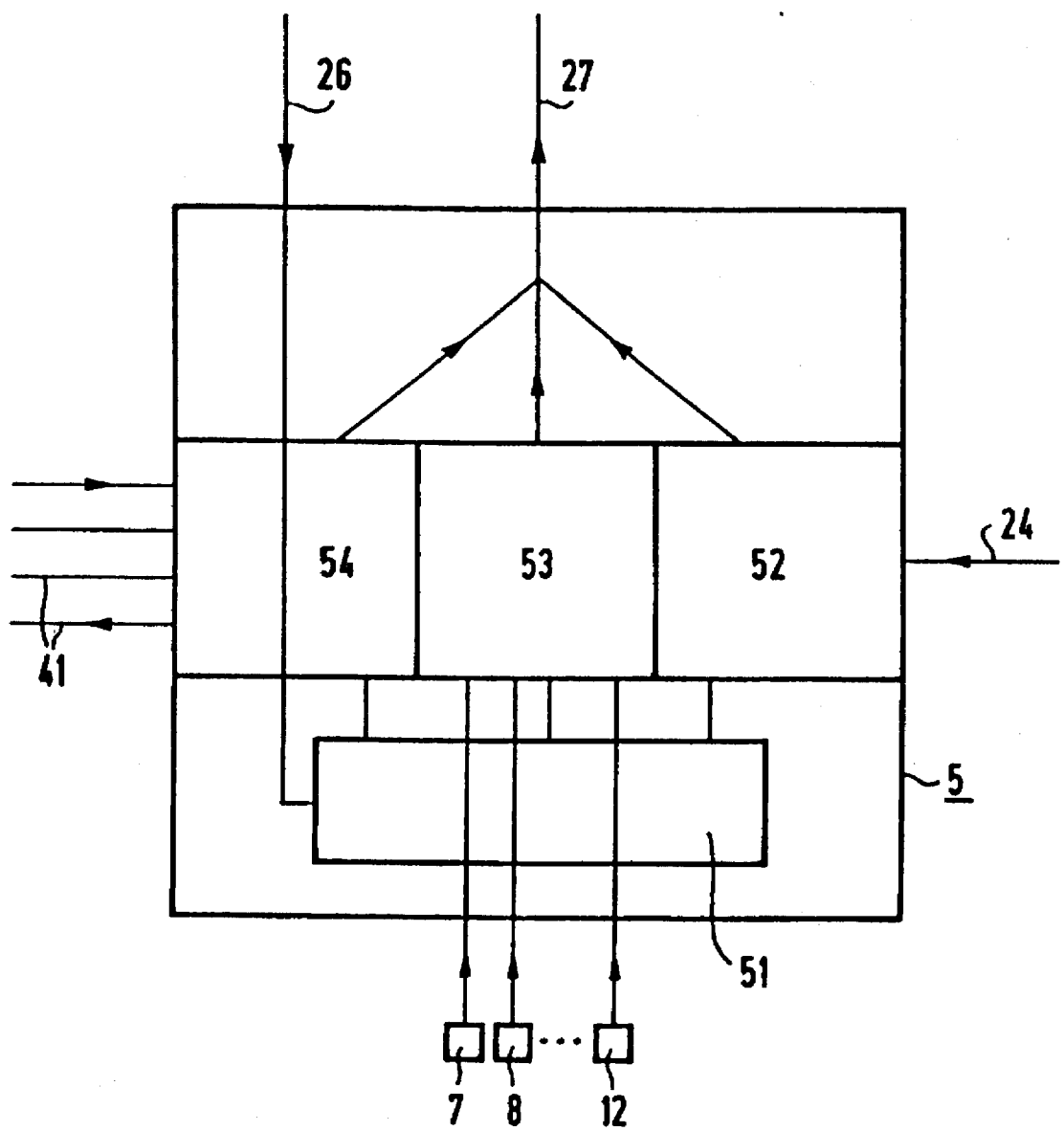
FIG. 3 is a schematic view of an electronic component with a plurality of control circuits.

FIG. 3, quite schematically, shows an exemplary embodiment for the basic layout of the electronic component 5. The component includes three or more sets of control circuit electronics 52, 53, 54. The control circuit electronics 52 serve to regulate the temperature in the catalytic converter 2, using the temperature measurement value of the temperature sensor 23 as an actual or real time value. The control circuit electronics 54 use an actual or real time value that is ascertained from a heat balance calculation. This calculation is done with data from the engine control unit communicated through the lines 41. The control circuit electronics 53 include a timing control means for heating the catalytic converter, optionally taking external measured values into account in calculating the heating interval. For instance, if a signal is received from the sensor 11, indicating that the car door is being opened, a relatively short heating interval is initiated. If a signal is received from the sensor 8, indicating that a start of the engine is highly imminent, a longer heating interval is initiated. The module 53 may naturally take additional information into account, such as, for instance, the outside temperature, engine temperature, catalytic converter temperature, etc.

Monitoring electronics 51 monitor the control circuits for their functional capability and effect a switchover from a nonfunctional control circuit to a functional one if a defect in the control circuit that is in operation is ascertained. The monitoring electronics 51 can also take other information into account, for instance information on the voltage drop at the power switch 20, and if abnormal situations arise can interrupt the heating or not initiate the heating in the first place.

Figure 4:
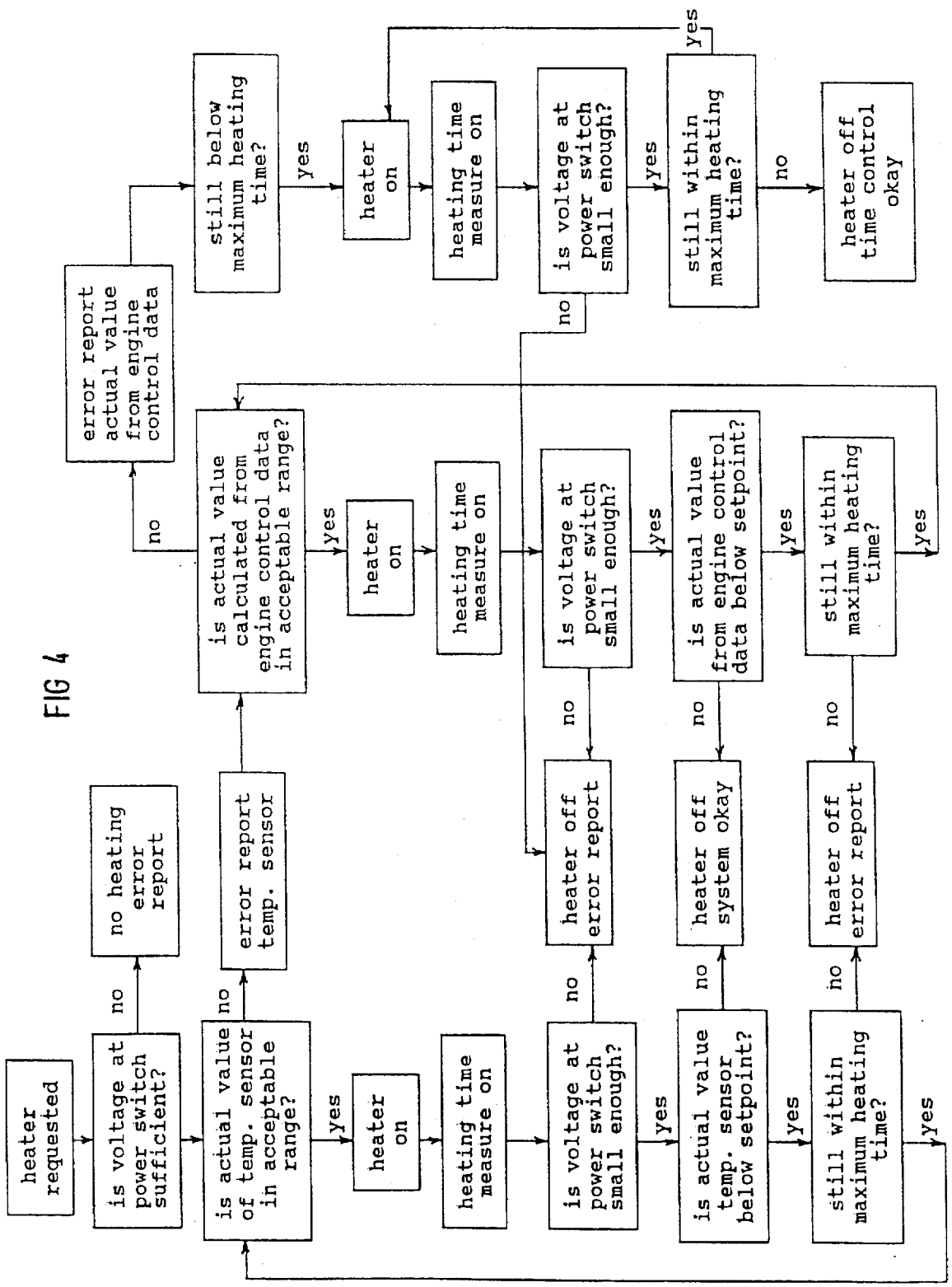
FIG. 4 shows an exemplary, simplified flow chart for the method according to the invention for safely operating an electrically heatable catalytic converter.

A much simplified flow chart for operating an electrically heatable catalytic converter is shown in FIG. 4. One must also consider that the electronics of a heated catalytic converter is usually linked with numerous further functions, which have been omitted herein for clarity. Particularly, in many types of vehicles it is necessary to regulate the supply of secondary air into the exhaust gas system in dependence on the temperature of the heated catalytic converter and of other parameters, and additional means may be provided in the electronics for monitoring the catalytic converter with regard to its functionality and its operating condition. These parts are omitted in the present overview.

When the heating of the catalytic converter is requested by the engine control, be it prior to the start-up of the engine in response to a triggering of various sensors in the motor vehicle (e.g. sensors 7–11) or after the start-up of the engine, the following sequence occurs:

First it is checked whether or not the voltage across the power switch lies above a threshold value. If it is not high enough, an error report is issued and the heating process is not initiated. It is possible in that case that there is a malfunction in the battery 6 or a line break in the heating lines 21, 22, 61, or 62. If the voltage is high enough, then the actual value of the temperature sensor 23 is queried next. If it lies in an acceptable range, i.e. if a sensible temperature is reported, then the electrically heatable catalytic converter (short: heater) is turned on. A heating time measurement is triggered simultaneously. Subsequently, the voltage across the power switch 20 is again queried. If, at this point, it is not small enough, then the heater 2 is turned off and an error report is issued. It is possible that the power switch 20 is partially defective or that there is a short at the heater 2.

If the voltage across the power switch 20 is small enough, then the actual value of the temperature sensor 23 is again queried and compared with a setpoint value. If the actual value lies below the setpoint value, then it is queried whether or not the maximum heating time has not yet been reached. If this is also the case, then the entire process is repeated, beginning with a check on the actual value of the temperature sensor 23. When, finally, the actual value of the temperature sensor 23 no longer lies below the setpoint value, then the heater 2 is turned off. The system, in that case, has functioned properly. Should the heater 2 not be turned off in this manner, then it is turned off upon the expiration of the maximum heating time, which, however, results in the issuance of an error report because it is possible that the temperature sensor 23 is defective or the total heating power is too small.

If the actual value of the temperature sensor 23 during the initial test is not in the admissible range, this indicates an error or a short in the temperature sensor 23 or in its measurement line 24. An error indication is issued in that case and control is switched to another control circuit 54. That control circuit 54 uses as the actual value a value which has been calculated from the engine control data. That value is also tested as to whether or not it lies within an acceptable range. If this is the case, then the heater 2 is turned on, unless it is already turned on. The heating time measurement is turned on or continued as well. In this control circuit, the voltage across the power switch 20 is tested as well and a possible exceeding of the maximal heating time is ascertained. If the control circuit 54 works correctly, then the actual value calculated from the engine data lies above the setpoint value and the heater 2 is turned off. The system, except for the error report on the temperature sensor, remains available.

Should the testing of the actual value calculated from the engine data turn out that the same lies outside of the acceptable range, then an error report is issued here as well, and control is switched to the next control circuit 53. That circuit tests whether or not the maximal heating time has been exceeded and, if necessary, it switches the heater 2 on, assuming it is not on yet. The heating time period is also turned on again or continued. After a test of the voltage across the power switch 20, the heating time is queried and the heater 2 is turned off when the maximum heating time is exceeded. In this case the system is available as well, yet there are two error reports on the temperature sensor and the actual value calculation from the engine control data.

As one can clearly see, the control circuits are hierarchically arranged, i.e. the most accurate one (yet most error-prone) is the preferred control circuit. Only when that circuit becomes partially unavailable, control is shifted to the next control circuit. The same switch is repeated upon a breakdown by switching to a third circuit. In principle it is possible for four or more circuits to be present. Also, if two temperature sensors are available, the first control circuit may be doubled up. The availability and reliability of the system is thereby considerably improved and it allows for mutual control among the various control circuits.

It is important that the hierarchically lowest stage is a control system which is as little error-prone as possible. In the most simple case it is a pure timing control. The electrical heating system is then still available, even if more intricate and optimal control cannot be provided.

The method according to the invention for operating an electrically heatable catalytic converter improves the operational dependability and the availability of the electrical heating, without impairing the availability of the motor vehicle. Stringent emissions regulations can therefore be obeyed with a high degree of dependability, even in a worst case scenario, in which individual components of the control system are lost due to a malfunction.

We claim:

1. A method of operating an electrical heater in a catalytic converter system, wherein the system is connected in an exhaust gas cleaning system downstream, as seen in an exhaust gas flow direction, of an internal combustion engine with an electronic engine control, wherein the electrical heater is supplied with an electrical current through a power switch operated by an electronic control, and wherein the electrical heater heats the system to or maintains the system above a minimum temperature necessary for catalytic conversion, the method which comprises:
   a) measuring a temperature of a catalytic converter and utilizing the temperature as a controlled variable of at least two different control circuits comprising a first control circuit and second control circuit;
   b) defining at least one first control circuit from the at least two different control circuits, and controlling a catalytic converter system in regular operation with the first control circuit;
   c) automatically monitoring an operation of the first control circuit for malfunction; and
   d) if a malfunction is detected, automatically transferring control to the second control circuit of the at least two control circuits.

2. The method according to claim 1, which further comprises providing each of the control circuits of the at least two different control circuits with a different structure.

3. The method according to claim 1, which further comprises providing each of the control circuits of the at least two different control circuits with a different degree complexity.

4. The method according to claim 1, which further comprises issuing an error indication or storing an error report, if a malfunction is detected.

5. The method according to claim 1, which further comprises providing the preferred control circuit with a temperature sensor in the catalytic converter system and measuring an actual temperature in the catalytic converter system, and supplying an electrical current through the heater in the catalytic converter system as a function of the actual temperature measured at the temperature sensor.

6. The method according to claim 1, which further comprises defining the at least two different control circuits as:
   a) a control circuit with a temperature sensor in the catalytic converter system as an actual value transducer;
   b) a control circuit in which an actual value is calculated in a heat balance calculation from data in the engine control unit;
   c) a control circuit in which the actual value is ascertained from measurement values of temperature transducers disposed outside of the catalytic converter system;
   d) a control circuit which raises the temperature of the catalytic converter system by determining a heating time period in dependence on measured values of at least one of an outside temperature sensor and an engine temperature sensor; and
   e) a control circuit which raises the temperature of the catalytic converter during a fixed heating time selecting the temperature in the catalytic converter as the controlled parameter of at least two of the defined control circuits, and assigning to each of the control circuits the catalytic converter system as a common controlled system, a power switch as a final control element, and the temperature in the catalytic converter as a controlled parameter.

7. The method according to claim 1, which further comprises simultaneously operating at least two control circuits and comparing and mutually monitoring an operation of the at least two control circuits, associating a security function with the second control circuit which has the most simple structure among the control circuits, and turning on the electrical current with the most simple control circuit when other control circuits do not switch on, and turning off the electrical current when the other control circuits do not switch off the electrical current, in response to predetermined criteria.

8. The method according to claim 1, which further comprises selecting from the at least two different control circuits a most simple control circuit in the form of a time controlled control circuit, and turning on the electrical current for a predetermined time interval and turning off the current after a predetermined time interval with the most simple control circuit.

9. The method according to claim 1, which further comprises taking all of the control circuits and the electrical heating of the catalytic converter system out of operation when the available electrical voltage or energy falls below a minimum value, or a voltage drop at a power switch lies outside given range.

10. The method according to claim 9, which further comprises reporting an error upon taking the control circuits and the electrical heating out of operation.

11. The method according to claim 9, which further comprises limiting a driving operation of the motor vehicle upon taking the control circuits and the electrical heating out of operation.

12. An assembly for operating an electrically heated catalytic converter system connected in an exhaust gas system of a motor vehicle, comprising:
   an electrical circuit for providing electrical power of between 0.5 and 10 kW, including a current source, a power switch, an electrically heatable catalytic converter system and electrical lines connecting said current source, said power switch and said electrically heatable catalytic converter system;
   at least two different control circuits, said power switch being a common final control element of said at least two different control circuits, said catalytic converter system being a common controlled system of said at least two different control circuits, and a temperature in said catalytic converter system being a controlled parameter of said control circuits;
   an electronic component having disposed therein control electronics associated with individual ones of said control circuits, and said electronic component including means for monitoring said control circuits and for selecting a functioning control circuit.

13. The assembly according to claim 12, further comprising a temperature sensor disposed in said catalytic converter system and electrically connected to said electronic component, said temperature sensor being associated with a first one of said control circuits as an actual value transducer thereof.

14. The assembly according to claim 13, further comprising a further actual value transducer associated with a second one of said control circuits, said further actual value transducer having means for calculating an actual temperature value from data of an engine control in a heat balance calculation.

15. The assembly according to claim 12, further comprising an actual value transducer associated with one of said control circuits, said transducer having means for calculating an actual temperature value from data of an engine control in a heat balance calculation.

16. The assembly according to claim 12, further comprising an additional control circuit having means for raising the temperature in said catalytic converter system by a timed control of an electrical heating current.

* * * * *